United States Patent
Knittel et al.

(10) Patent No.: US 6,297,799 B1
(45) Date of Patent: Oct. 2, 2001

(54) THREE-DIMENSIONAL CURSOR FOR A REAL-TIME VOLUME RENDERING SYSTEM

(76) Inventors: James Knittel, 241 Hill Rd., Groton, MA (US) 01450; Vikram Simha, 414 Katahdin Dr., Lexington, MA (US) 02421

(*) Notice: Subject to any disclaimer, the term of this patent is extended or adjusted under 35 U.S.C. 154(b) by 0 days.

(21) Appl. No.: 09/190,332

(22) Filed: Nov. 12, 1998

(51) Int. Cl.[7] .................................................. Q06T 15/00
(52) U.S. Cl. ........................ 345/145; 345/501; 345/506; 345/419; 345/425
(58) Field of Search .................................... 345/420, 421, 345/422, 423, 424, 425, 426, 427, 145, 501, 506, 419; G06F 15/00

(56) References Cited

U.S. PATENT DOCUMENTS

| | | | |
|---|---|---|---|
| 5,467,459 | * 11/1995 | Alexander | 395/480 |
| 5,544,283 | * 8/1996 | Kaufman | 395/124 |
| 5,594,842 | * 1/1997 | Kaufman | 395/124 |
| 5,847,711 | * 12/1998 | Kaufman | 345/424 |
| 5,872,902 | * 2/1999 | Kuchkuda | 345/430 |
| 5,886,701 | * 3/1999 | Chauvin | 345/418 |
| 5,986,662 | * 11/1999 | Argiro | 345/424 |
| 6,008,813 | * 12/1999 | Lauer | 345/418 |
| 6,014,143 | * 1/2000 | Naqvi | 345/427 |
| 6,028,608 | * 2/2000 | Jenkins | 345/433 |

* cited by examiner

Primary Examiner—Mark R. Powell
Assistant Examiner—Wesner Sajous (57) ABSTRACT

A low-cost, real-time volume rendering system including a three-dimensional cursor for interactively identifying and marking positions within a three-dimensional volume data set during display is disclosed. The cursor appearance is configurable such that it may appear as cross hairs, cross planes, or some combination thereof, with each cursor dimension being selectively enabled. Each cursor dimension is configurable in terms of color and level of opacity. The shape of the edges and the appearance of the intersection of the dimensions is configurable, and the colors of the individual cursor components may alternately blend or obscure the colors of the objects behind them. The cursor is realized through use of a comparison circuit operating in conjunction with a parallel pipeline processor optimized for volume rendering using a ray-casting technique. The comparison circuit checks whether the data sample is taken from a region of the three-dimensional object which may be affected by the presence of a three-dimensional cursor. Voxels which collectively define the object are ordered according to a given three-dimensional coordinate system; the desired cursor is also defined with respect to this coordinate system.

25 Claims, 9 Drawing Sheets

CROSS-HAIR

FIG. 6

CROSS-PLANE

THREE-DIMENSIONAL CURSOR FOR A REAL-TIME VOLUME RENDERING SYSTEM

CROSS REFERENCE TO RELATED APPLICATIONS

N/A

BACKGROUND OF THE INVENTION

The present invention is related to the field of computer graphics, and in particular to volume graphics.

Volume graphics is the sub-field of computer graphics that deals with the visualization of objects or phenomena represented as sampled data in three or more dimensions. These samples are called volume elements, or "voxels," and contain digital information representing physical characteristics of the objects or phenomena being studied.

For example, voxel values for a particular object or system may represent density, type of material, temperature, velocity, or some other property at discrete points in space throughout the interior and in the vicinity of that object or system.

Volume rendering is the part of volume graphics concerned with the projection of volume data as two-dimensional images for purposes of printing, display on computer terminals, and other forms of visualization. By assigning colors and transparency to particular voxel data values, different views of the exterior and interior of an object or system can be displayed. For example, a surgeon needing to examine the ligaments, tendons, and bones of a human knee in preparation for surgery can utilize a tomographic scan of the knee and cause voxel data values corresponding to blood, skin, and muscle to appear to be completely transparent. The resulting image then reveals the condition of the ligaments, tendons, bones, etc. which are hidden from view prior to surgery, thereby allowing for better surgical planning, shorter surgical operations, less surgical exploration and faster recoveries. In another example, a mechanic using a tomographic scan of a turbine blade or welded joint in a jet engine can cause voxel data values representing solid metal to appear to be transparent while causing those representing air to be opaque. This allows the viewing of internal flaws in the metal that would otherwise be hidden from the human eye.

Real-time volume rendering is the projection and display of volume data as a series of images in rapid succession, typically at 30 frames per second or faster. This makes it possible to create the appearance of moving pictures of the object, phenomenon, or system of interest. It also enables a human operator to interactively control the parameters of the projection and to manipulate the image, while providing to the user immediate visual feedback. It will be appreciated that projecting tens of millions or hundreds of millions of voxel values to an image requires enormous amounts of computing power. Doing so in real-time requires substantially more computational power.

Further background on volume rendering is included in a Doctoral Dissertation entitled "Architectures for Real-Time Volume Rendering" submitted by Hanspeter Pfister to the Department of Computer Science at the State University of New York at Stony Brook in December 1996, and in U.S. Pat. No. 5,594,842, "Apparatus and Method for Real-time Volume Visualization." Additional background on volume rendering is presented in a book entitled "Introduction to Volume Rendering" by Barthold Lichtenbelt, Randy Crane, and Shaz Naqvi, published in 1998 by Prentice Hall PTR of Upper Saddle River, New Jersey.

A number of techniques are available for transforming the three-dimensional set of voxels representing the object into spatial coordinates in front of or behind the viewing surface. These techniques essentially compute the color and intensity of light at discrete points or "pixels" on the viewing surface. For instance, one technique converts the three-dimensional data set into a "texture map" stored in memory. The concept of texture mapping is well known in the computer graphics art. This map is then employed to "paint" a series of parallel planes, each perpendicular to the viewing axis and appearing to be a cross-section of the object in question. The planes are then mathematically combined by a computer system to form an image of what appears to the viewer to be a three-dimensional object.

Another technique is referred to as "ray-casting," in which imaginary rays are passed from the eye of the viewer through pixels on the viewing surface, then through the object. Each ray accumulates the visual characteristics of the object as it passes through it. This accumulated, or integrated, data is then assigned to the pixel through which the ray passes. A combination of accumulated data from all rays results in a visible image on the viewing screen.

Since rays do not necessarily pass through voxels, it is necessary to interpolate data values as the ray passes through the object volume. Various techniques can be employed to perform such interpolation, with varying degrees of quality and realism resulting.

As noted, the realization of a two-dimensional image of a three-dimensional object, in real time, requires a significant amount of computing power, either in terms of hardware or software. At present, the fastest software implementation significantly sacrifices frame rate in order to meet a minimum Level of resolution, or sacrifices resolution in order to meet minimum frame rate requirements.

As for hardware, an improvement over the ray-casting approach previously described involves the use of parallel rays, each perpendicular to the viewing surface and cast through the three-dimensional object, thus enabling the processing of the object data space in "slices," a technique uniquely suited for parallel pipeline processing. Rows, or partial rows, of voxels within a first slice are processed by successive pipelines until the first slice has been processed. Then rows, or partial rows, from the next slice are processed in the same way. The voxels are thereby fetched and processed in an orderly fashion until the entire volume data set has been processed and an image has been formed.

Regardless of the technique utilized to realize a two-dimensional image representation of a three-dimensional object, it is desirable to provide some form of indicator which can be used to identify or mark positions within a real-time rendering of a three-dimensional volume data set during display. A cursor, well-known in contemporary word processing and graphical user interface applications, is a form of indicator, but which typically provides utility within a display of a two-dimensional workspace.

In the realm of volume graphics, three-dimensional cursors have been proposed before. However, the previously practiced techniques utilized to render a three-dimensional data space into a two-dimensional display have only enabled cursor generating methods which ultimately result in significant delays in rendering speed. For instance, in the texture-mapping technique previously described, a cursor can only be displayed in conjunction with the two-dimensional rendering of the desired object through the separate modeling of the desired cursor in three-dimensions and the subsequent interleaving or "blending" or the modelled cursor into the three-dimensioned data-space of the desired object, all prior to the initiation of the rendering process. In particular, a single axis cursor can be modelled as a rectangular solid having a discrete width and thickness (determined, for instance, in the x and y axes), and having a slope (in the z-axis) defined by a start and end point. Once so modelled, the sliced representation of the cursor is then blended into the parallel planes defining the object data space. Obviously, such cursor model generation and blending results in significant processing overhead since the geometry processed to achieve the two-dimensional rendering must be altered every time the cursor is relocated, or the desired object is re-oriented.

Additionally, prior art cursors for volume graphics have heretofore provided limited choice in terms of cursor appearance and interaction with the object to be rendered. Thus, not only has the provision of a cursor for these applications been detrimental to the realization of a real-time volume rendering system in terms of complexity and speed, it has also enabled a cursor of only limited configurability.

BRIEF SUMMARY OF THE INVENTION

It is an object of the presently disclosed invention to provide a low-cost, real-time volume rendering system including a three-dimensional cursor for interactively identifying and marking positions within a three-dimensional volume data set during display. In conjunction therewith, the cursor appearance is configurable according to the preferences of the user, such that it may appear as cross hairs, cross planes, or some combination thereof, with each cursor dimension being selectively enabled. Further, each cursor dimension is configurable in terms of color and level of opacity. The shape of the edges and the appearance of the intersection of the dimensions are configurable, and the colors of the individual cursor components may alternately blend or obscure the colors of the objects behind them. In a further embodiment, each of the cursor components may be configured independently in terms of length and width.

These objects are achieved by the provision of a comparison circuit operating in conjunction with a parallel pipeline processor optimized for volume rendering using a ray-casting technique. As the processor is operating on a data sample either taken directly from a data set representing the three-dimensional object to be rendered or from an interpolated data value derived from the object data set, the comparison circuit checks whether the data sample is taken from a region of the three-dimensional object which may be affected by the presence of a three-dimensional cursor. Because this comparison is performed as a further step in the processing pipeline, throughput is not affected; latency is incrementally increased by the introduction of this comparison stage.

If, as a result of the spatial comparison, it is determined that the current data sample is outside the cursor region, processing of the sample continues as usual. If the sample is within the region occupied by the cursor, as defined by the user, the color and opacity of the cursor are factored into the color and opacity of the current sample. This factoring includes the blending of the attributes of the cursor with those of the data sample, or the replacement of the cursor attributes for those of the data sample, at the option of the user. Processing of the modified sample, in terms of compositing the present sample with those previously processed, then continues as normal.

Control over the positioning and appearance of the cursor is accomplished by software settable registers, which are then referred to during the comparison procedures noted above. The voxels which collectively define the object are ordered according to a given three-dimensional coordinate system. The desired cursor is also defined with respect to this coordinate system. As the object is rotated, the cursor maintains a fixed position within the object and rotates with the object. In the prior art, it is necessary to redraw the cursor as an object and blend the cursor into the desired object every time the cursor is to be moved. The latter hindrance makes a software implementation of such a cursor impracticable since the cursor field comparison requires an additional compare step for each data sample, delaying the processing of all other samples.

The ray-casting technique is comprised essentially of four basic parts, which are introduced here and discussed in further detail subsequently. For each ray, a set of sample points along the ray through the object volume is defined. Since the ray won't pass directly through all voxels, the data at the sample points must be interpolated from the voxels which define the object. Next, each sample point along each ray is operated on by a classification algorithm to define the color and opacity of the sample point. Third, a gradient, derived from the volume data in the vicinity of the sample point, is used as an input to an illumination algorithm for computing the shade of color for the sample point. Finally, the illuminated colors and opacities of the sample points along the rays are accumulated using a compositing algorithm to produce a pixel value for the point where the ray crosses the base plane.

The first two parts of the ray-casting technique just described can be performed in either order, preferably at the option of the user. For instance, in medical imaging applications, interpolating between a voxel that is half bone and half muscle and a voxel that is all bone may result in a sample which is three-quarters bone and one-quarter muscle, a fair characterization of the sample point. However, data which has been interpolated may be difficult to "segment," or classify as having one set of characteristics versus another. Therefore, in those applications, it may be preferable to classify the voxels, then interpolate, resulting in a fifty-fifty mix for samples intermediate the boundary voxels.

The comparison of the data sample location to the cursor field can occur at either of two points within the foregoing four-step ray-casting technique. In a first embodiment, the comparison and (potential) sample data/cursor data blending occurs during compositing. Thus, as the sample data is being prepared for compositing with the previously accumulated sample data along the respective ray, the effect of the cursor, if any, is accounted for. In a second embodiment, the comparison and potential blending occurs during the application of the classification algorithm and prior to the interpolation stage in the embodiment in which classification precedes interpolation.

BRIEF DESCRIPTION OF THE DRAWINGS

The foregoing features of this invention, as well as the invention itself, may be more fully understood from the following Detailed Description of the Invention, and Drawing, of which.

DETAILED DESCRIPTION

Figure 1:
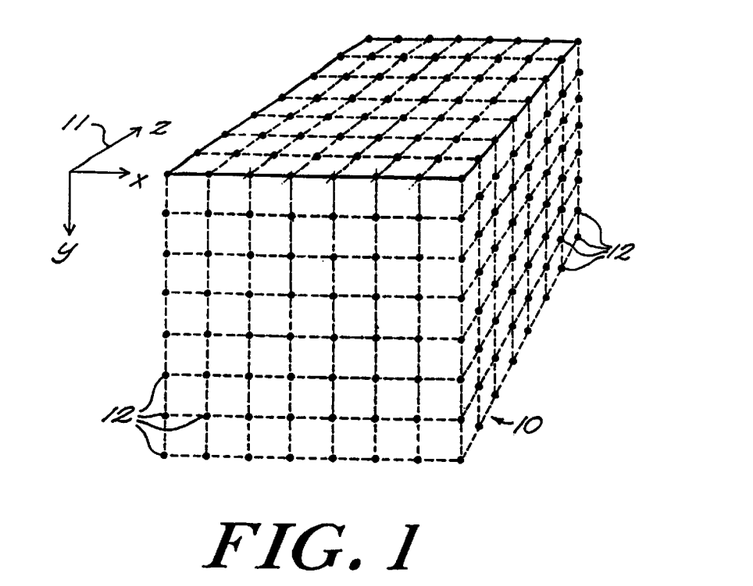
FIG. 1 is a diagrammatic illustration of a volume data set.

Referring now to FIG. 1 and by way of further background, a view of a three-dimensional volume data set 10 is shown. FIG. 1 depicts an array of voxel positions 12 arranged in the form of a rectangular solid. More particularly, the voxel positions fill the solid in three dimensions and are uniformly spaced. The position of each voxel can be represented in a coordinate system defined by the three axes 11 labeled X, Y, and Z. Associated with each voxel position is one or more data values representing some characteristics of the object, system, or phenomenon under study, for example density, type of material, temperature, velocity, opacity or other properties at discrete points in space throughout the interior and in the vicinity of that object or system. It is convenient to represent a volume data set in a computer as a three-dimensional array of values, with the value at array index position (X, Y, Z) corresponding to the volume data values at coordinates (X, Y, Z) in three-dimensional space.

Figure 2:
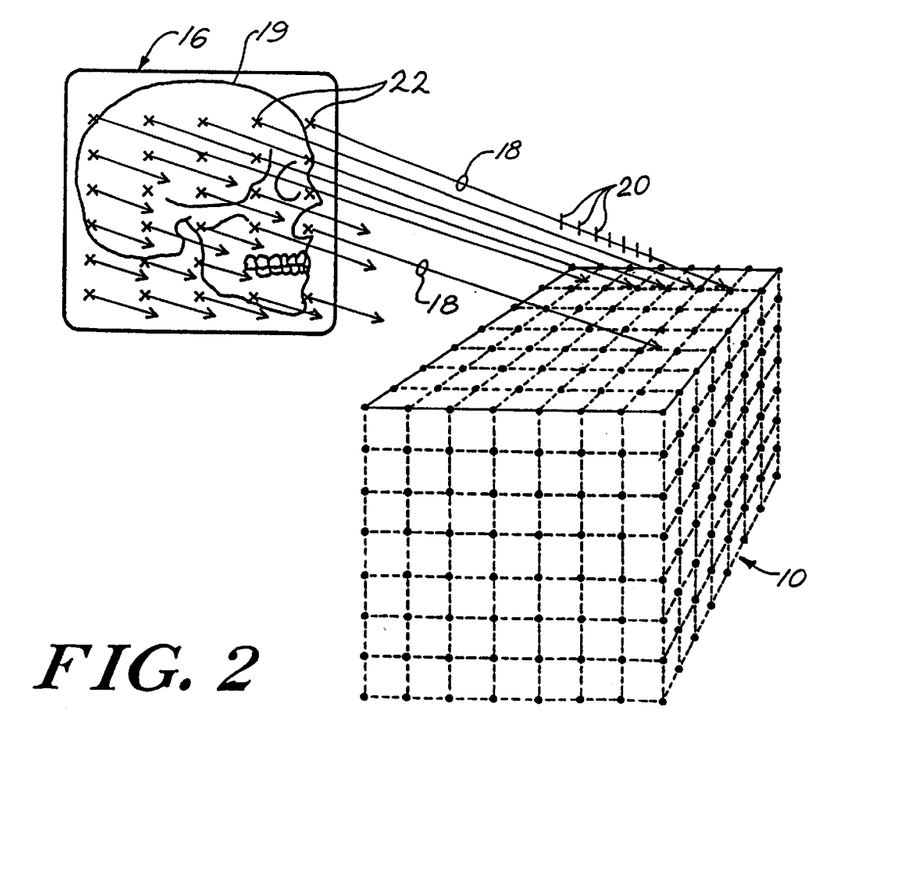
FIG. 2 is a diagrammatic illustration of a view of a volume data set being projected onto an image plane by means of ray-casting.

FIG. 2 illustrates an example of a volume data set 10 comprising an array of slices from a tomographic scan of the human head. A two-dimensional image plane 16 represents the surface on which a volume rendered projection of the human head is to be displayed. In a technique known as ray-casting, rays 18 are cast from pixel positions 22 on the image plane 16 through the volume data set 10, with each ray accumulating color and opacity from the data at voxel positions as it passes through the volume. In this manner, the color, transparency, and intensity as well as other parameters of a pixel are extracted from the volume data set as the accumulation of data at sample points 20 along the ray. In this example, voxel values associated with bony tissue are assigned an opaque color, and voxel values associated with all other tissue in the head are assigned a transparent color. Therefore, the result of the accumulation of data along a ray and the attribution of this data to the corresponding pixel result in an image 19 in a viewing plane 16 that appears to an observer to be an image of a three-dimensional skull, even though the actual skull is hidden from view by the skin and other tissue of the head.

Figure 3:
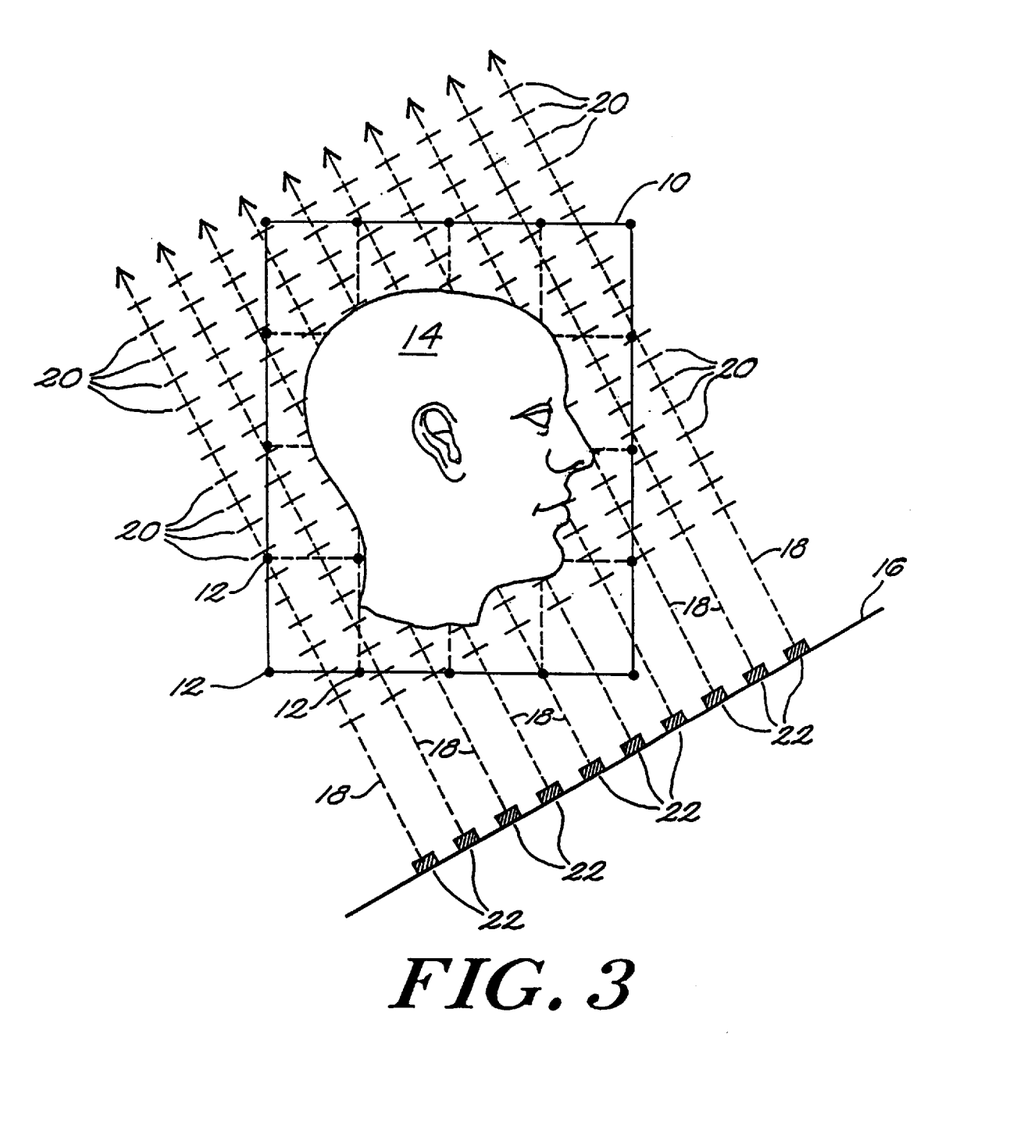
FIG. 3 is a cross-sectional view of the volume data set FIG. 2.

In order to appreciate more fully the method of ray-casting, FIG. 3 depicts a two-dimensional cross-section of a three-dimensional volume data set 10 of FIG. 2. First and second dimensions correspond to the dimensions illustrated on the plane of the page. The third dimension of volume data set 10 is perpendicular to the printed page so that only a cross section of the data set can be seen in the figure. Voxel positions are illustrated by dots 12 in the figure. The voxels associated with each position are data values that represent some characteristic or characteristics of a three-dimensional object 14 at fixed points of a rectangular grid in three-dimensional space. Also illustrated in FIG. 3 is a one-dimensional view of a two-dimensional image plane 16 onto which an image of object 14 is to be projected in terms of providing pixels 22 with the appropriate characteristics. In this illustration, the second dimension of image plane 16 is also perpendicular to the printed page.

In the technique of ray-casting, rays 18 are extended from pixels 22 of the image plane 16 through the volume data set 10. Each ray accumulates color, brightness, and transparency or opacity at sample points 20 along that ray. This accumulation of light determines the brightness and color of the corresponding pixels 22. Thus, while the ray is depicted going outwardly from a pixel through the volume, the accumulated data can be thought of as being transmitted back down the ray where it is provided to the corresponding pixel to give the pixel color, intensity and opacity or transparency, amongst other parameters.

It will be appreciated that although FIG. 3 suggests that the third dimension of volume data set 10 and the second dimension of image plane 16 are both perpendicular to the printed page and therefore parallel to each other, in general this is not the case. The image plane may have any orientation with respect to the volume data set, so that rays 18 may pass through volume data set 10 at any angle in all three dimensions.

It will also be appreciated that sample points 20 do not necessarily intersect the voxel 12 coordinates exactly. Therefore, the value of each sample point must be synthesized from the values of voxels nearby. That is, the intensity of light, color, and transparency or opacity at each sample point 20 must be calculated or interpolated as a mathematical function of the values of nearby voxels 12. The re-sampling of voxel data values at sample points is an application of the branch of mathematics known as sampling theory. The sample points 20 of each ray 18 are then accumulated by another mathematical function to produce the brightness and color of the pixel 22 corresponding to that ray. The resulting set of pixels 22 forms a visual image of the object 14 in the image plane 16.

Figure 4:
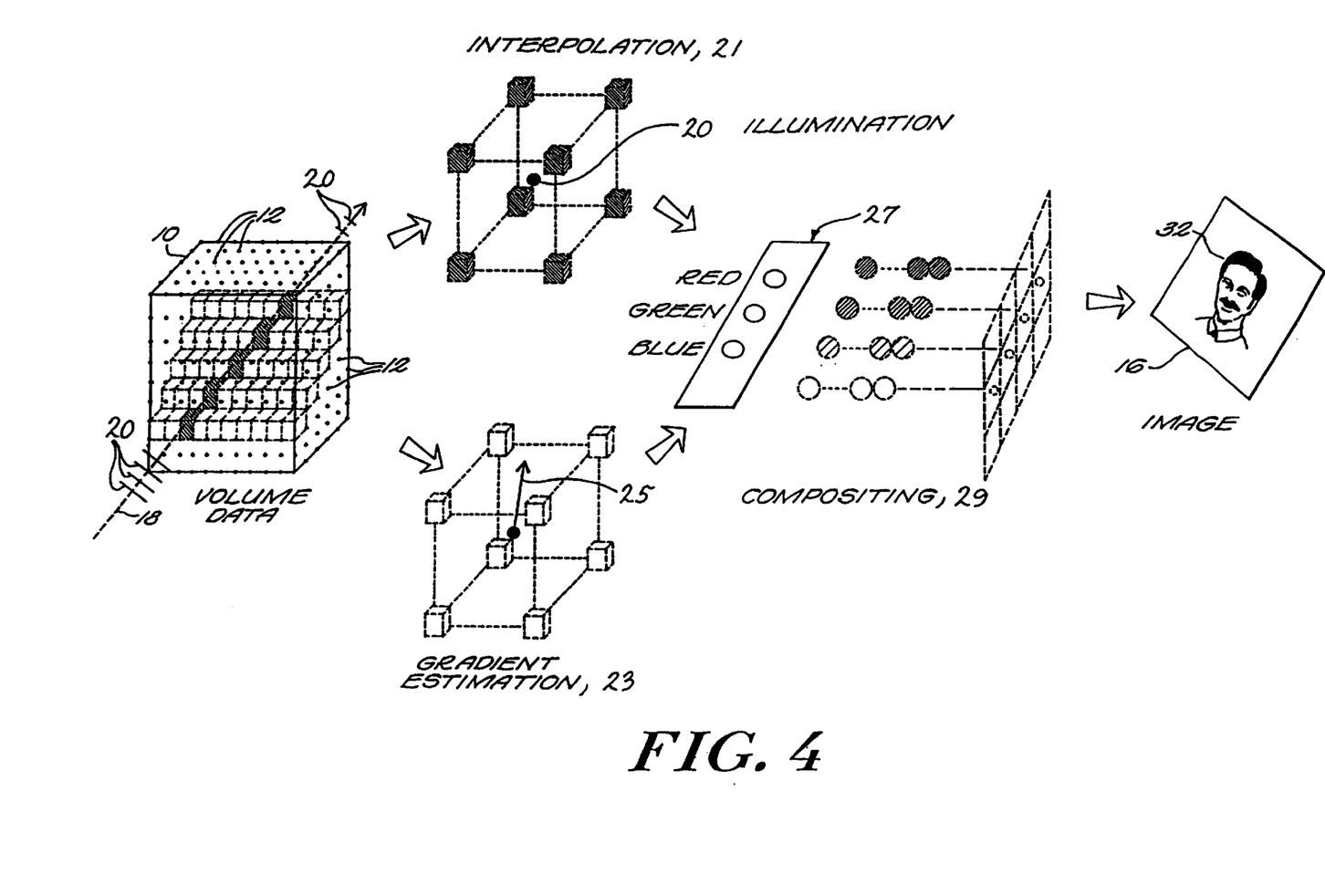
FIG. 4 is a diagrammatic illustration of the processing of an individual ray by ray-casting.

FIG. 4 illustrates the processing of an individual ray. Ray 18 passes through the three-dimensional volume data set 10 at some angle, passing near or possibly through voxel positions 12, and accumulates data at sample points 20 along each ray. The value at each sample point is synthesized as illustrated at 21 by an interpolation unit 103 (See FIG. 5), and its gradient is calculated as illustrated at 23 by a gradient estimation unit 111 (See FIG. 5). The sample point values from sample point 20 and the gradient 25 for each sample point are then processed in the pipeline to assign color, brightness or intensity, and transparency or opacity to each sample. As illustrated at 27, this is done via pipeline processing in which red, green and blue hues as well as intensity and opacity or transparency are calculated. Finally, the colors, levels of brightness, and transparencies assigned to all of the samples along all of the rays are applied as illustrated at 29 to a compositing unit 124 that mathematically combines the sample values into pixels depicting the resulting image 32 for display on image plane 16.

The calculation of the color, brightness or intensity, and transparency of sample points 20 is done in two parts. In one part, a mathematical function such as tri-linear interpolation is utilized to take the weighted average of the values of the eight voxels in a cubic arrangement immediately surrounding the sample point 20. The resulting average is then used to assign a color and opacity or transparency to the sample point by some transfer function. In the other part, the mathematical gradient of the sample values at each sample point 20 is estimated by a method such as taking the differences between nearby sample points. It will be appreciated that these two calculations can be implemented in either order or in parallel with each other to produce mathematically equivalent results. The gradient is then used in a lighting calculation to determine the brightness of the sample point. Lighting calculations are well-known in the computer graphics art and are described, for example, in the textbook "Computer Graphics: Principles and Practice," $2^{nd}$ edition, by J. Foley, A. vanDam, S. Feiner, and J. Hughes, published by Addison-Wesley of Reading, Mass., in 1990.

Figure 5:
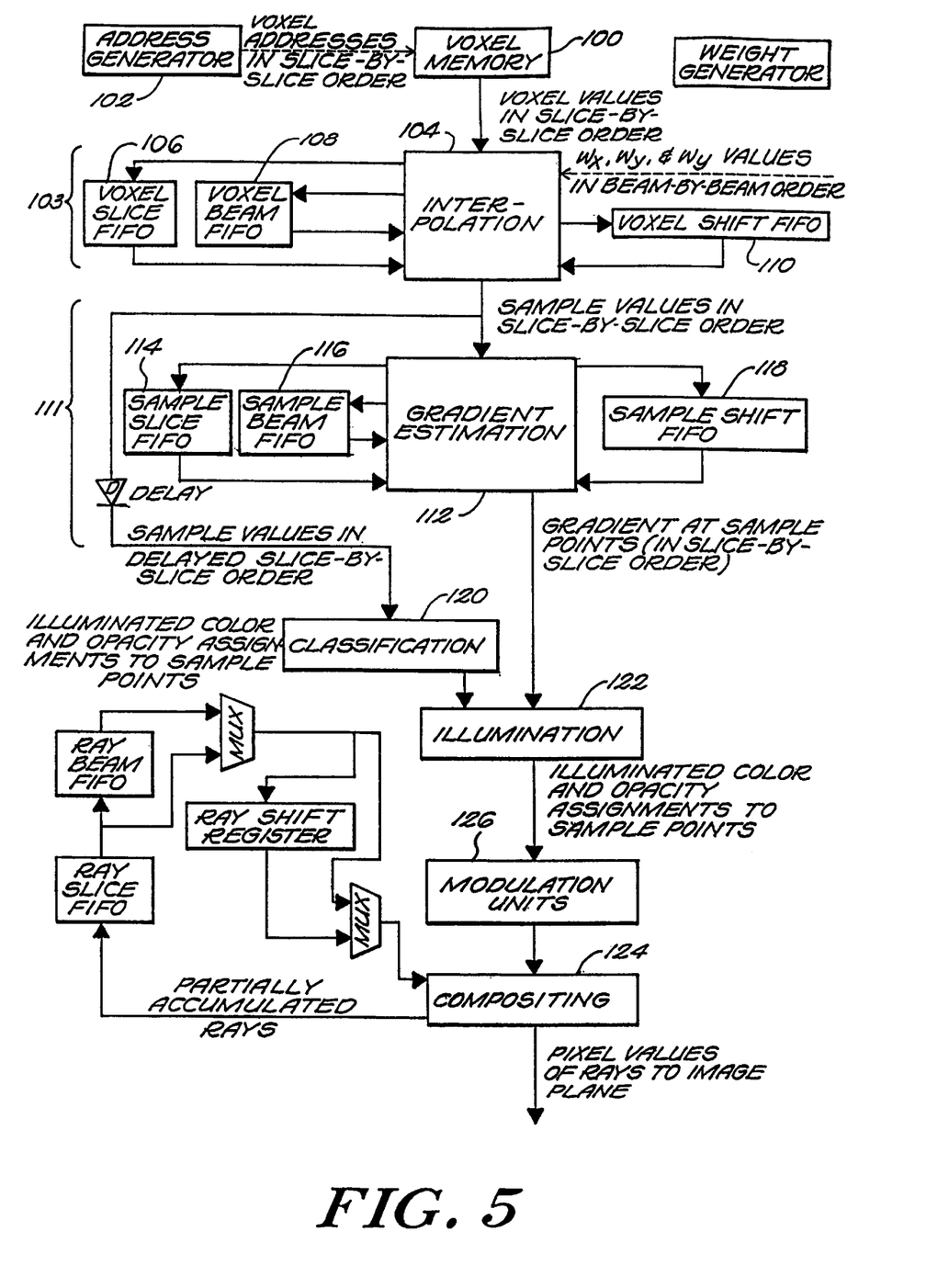
FIG. 5 is a block diagram of a pipelined processing element for real-time volume rendering in accordance with the present invention.

FIG. 5 depicts a block diagram of a pipelined processor appropriate for performing the calculations illustrated in FIG. 4. The pipelined processor comprises a plurality of pipeline stages, each stage of which holds one data element, so that a plurality of data elements are being processed at one time. Each data element is at a different degree of progress in its processing, and all data elements move from stage to stage of the pipeline in lock step. At the first stage of the pipeline, a series of voxel data values flow into the pipeline at a rate of one voxel per cycle from the voxel memory 100, which operates under the control of an address generator 102. The interpolation unit 104 receives voxel values located at coordinates X, Y and Z in three-dimensional space, where X, Y and Z are each integers. The interpolation unit 104 is a set of pipelined stages that synthesize data values at sample points between voxels corresponding to positions along rays that are cast through the volume. During each cycle, one voxel enters the interpolation unit and one interpolated sample value emerges. The latency between the time a voxel value enters the pipeline and the time that an interpolated sample value emerges depends upon the number of pipeline stages and the internal delay in each stage.

The interpolation stages of the pipeline comprise a set of interpolator stages 104 and three FIFO elements 106, 108, 110 for recirculating data through the stages. In the current embodiment, these are all linear interpolations, but other interpolation functions such as cubic and LaGrangian may also be employed. In the illustrated embodiment, interpolation is performed in each dimension as a separate stage, and the respective FIFO elements are included to recirculate data for purposes of interpolating between voxels that are adjacent in space but widely separated in the time of entry to the pipeline. The delay of each FIFO is selected to be exactly the amount of time elapsed between the reading of one voxel and the reading of an adjacent voxel in that particular dimension so that the two can be combined in an interpolation function. It will be appreciated that voxels can be streamed through the interpolation stage at a rate of one voxel per cycle with each voxel being combined with the nearest neighbor that had been previously recirculated through the FIFO associated with that dimension.

Three successive interpolation stages, one for each dimension, are concatenated and voxels can pass through the three stages at a rate of one voxel per cycle at both input and output. The throughput of the interpolation stages is one voxel per cycle independent of the number of stages within the interpolation unit and independent of the latency of the data within the interpolation unit and the latency of the recirculation stages within that unit. Thus, the interpolation unit converts voxel values located at integer positions in XYZ space into sample values located at non-integer positions at the rate of one voxel per cycle. In particular, the interpolation unit converts values at voxel positions to values at sample positions disposed along the rays.

Following the interpolation unit 104 is a gradient estimation unit 112, which also comprises a plurality of pipelined stages and recirculation FIFOs. The function of the gradient unit 112 is to derive the rate of change of the sample values in each of the three dimensions. The gradient estimation unit operates in a similar manner to the interpolation unit 104 and computes the rate of change of the sample values in each of the three dimensions. Note, the gradient is used to determine a normal vector for illumination, and its magnitude may be used as a measure of the existence of a surface when the gradient magnitude is high. In the present embodiment the calculation is obtained by taking central differences, but other functions known in the art may be employed.

Because the gradient estimation unit is pipelined, it receives one interpolated sample per cycle, and it outputs one gradient per cycle. As with the interpolation unit, each gradient is delayed from its corresponding sample by a number of cycles which is equal to the amount of latency in the gradient estimation unit 112 including respective recirculation FIFOs 114, 116, 118. The delay for each of the recirculation FIFOs is determined by the length of time needed between the reading of one interpolated sample and nearby interpolated samples necessary for deriving the gradient in that dimension.

The interpolated sample and its corresponding gradient are concurrently applied to the classification and illumination units 120 and 122 at a rate of one interpolated sample and one gradient per cycle. Classification unit 120 serves to convert interpolated sample values into colors in the graphics system; i.e. red, green, blue and alpha values, also known as RGBA values. The red, green and blue values are typically fractions between zero and one inclusive and represent the intensity of the color component assigned to the respective interpolated sample value. The alpha value is also typically a fraction between zero and one inclusive and represents the opacity assigned to the respective interpolated sample value.

The gradient is applied to the illumination unit 122 to modulate the newly assigned RGBA values by adding highlights and shadows to provide a more realistic image. Methods and functions for performing illumination functions are well known in the art. The illumination and classification units accept one interpolated sample value and one gradient per cycle and output one illuminated color and opacity value per cycle.

Although in the current embodiment, the interpolation unit 104 precedes the gradient estimation unit 112, which in turn precedes the classification unit 120, it will be appreciated that in other embodiments these three units may be arranged in a different order. In particular, for some applications of volume rendering it is preferable that the classification unit precede the interpolation unit. In this case, data values at voxel positions are converted to RGBA values at the same positions, then these RGBA values are interpolated to obtain RGBA values at sample points along rays.

The compositing unit 124 combines the illuminated color and opacity values of all sample points along a ray to form a final pixel value corresponding to that ray for display on the computer terminal or two-dimensional image surface. RGBA values enter the compositing unit 124 at a rate of one RGBA value per cycle and are accumulated with the RGBA values at previous sample points along the same ray. When the accumulation is complete, the final accumulated value is output as a pixel to the display or stored as image data. The compositing unit 124 receives one RGBA sample per cycle and accumulates these ray by ray according to a compositing function until the ends of rays are reached, at which point the one pixel per ray is output to form the final image. A number of different functions well known in the art can be employed in the compositing unit, depending upon the application.

Between the illumination unit 122 and the compositing unit 124, various modulation units 126 may be provided to permit modification of the illuminated RGBA values, thereby modifying the image that is ultimately viewed. One such modulation unit is used for cropping the sample values to permit viewing of a restricted subset of the data. Another modulation unit provides a function to show a slice of the volume data at an arbitrary angle and thickness. A third modulation unit, in accordance with the present invention, provides a three-dimensional cursor to allow the user or operator to identify positions in XYZ space within the data. Each of the above identified functions is implemented as a plurality of pipelined stages accepting one RGBA value as input per cycle and emitting as an output one modulated RGBA value per cycle. Other modulation functions may also be provided which may likewise be implemented within the pipelined architecture herein described. The addition of the pipelined modulation functions does not diminish the throughput (rate) of the processing pipeline in any way but rather affects the latency of the data as it passes through the pipeline.

In order to achieve a real-time volume rendering rate of, for example, 30 frames per second for a volume data set with 256×256×256 voxels, voxel data must enter the pipelines at $256^3 \times 30$ frames per second or approximately 500 million voxels per second. It will be appreciated that although the calculations associated with any particular voxel involve many stages and therefore have a specified latency, calculations associated with a plurality of different voxels can be in progress at once, each one being at a different degree of progression and occupying a different stage of the pipeline. This makes it possible to sustain a high processing rate despite the complexity of the calculations.

It will be further appreciated that the above described pipelined processor can be replicated as a plurality of parallel pipelines to achieve higher throughput rates by processing adjacent voxels in parallel. The cycle time of each pipeline is determined by the number of voxels in a typical volume data set, multiplied by the desired frame rate, and divided by the number of pipelines. In a preferred embodiment, the cycle time is 7.5 nanoseconds and four pipelines are employed in parallel.

As previously noted, one of the modulation units 126 (FIG. 5) which is optionally employed between the illumination unit 122 and the compositing unit 124 is a three-dimensional (3-D) cursor generation unit. The 3-D cursor unit allows the insertion of a hardware generated, software controlled cursor into the volume data set being rendered, where the cursor rotates as the object itself is rotated. Flexibility in cursor definition includes the ability to: separately enable each of the three cursor axis components; define the cursor type as either a cross hair cursor or a cross plane cursor; define the blending mode (alpha-blend or replacement) for the cursor; define a common length and width of the cursor axis components; and define the colors per axis component. In a further embodiment of the present invention, cursor definition additionally includes the ability to define the type of each cursor axis component individually as a line, thus enabling a variety of combinations of cursor axis component types.

At a basic level, the 3-D cursor modulation unit compares the location of a sample being processed with a definition of the location of a 3-D cursor. If there is no overlap, the RGBA value assigned to the sample proceeds unmodified to other modulation units, if any, then to the compositing unit 124. If there is overlap between the sample and the cursor, then the RGBA value of the sample may be effected by the RGBA definition of the cursor at that location, as will be discussed in detail below. The modified sample is then passed on to the next modulation unit, if any, and then to the compositing unit.

Figure 6:
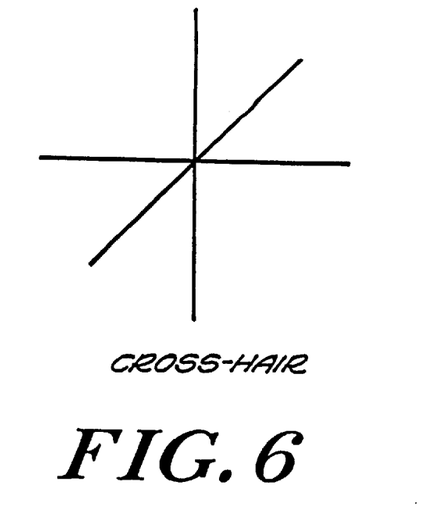
FIG. 6 is a diagrammatic illustration of a cross hair type cursor as enabled by the present invention.
Figure 7:
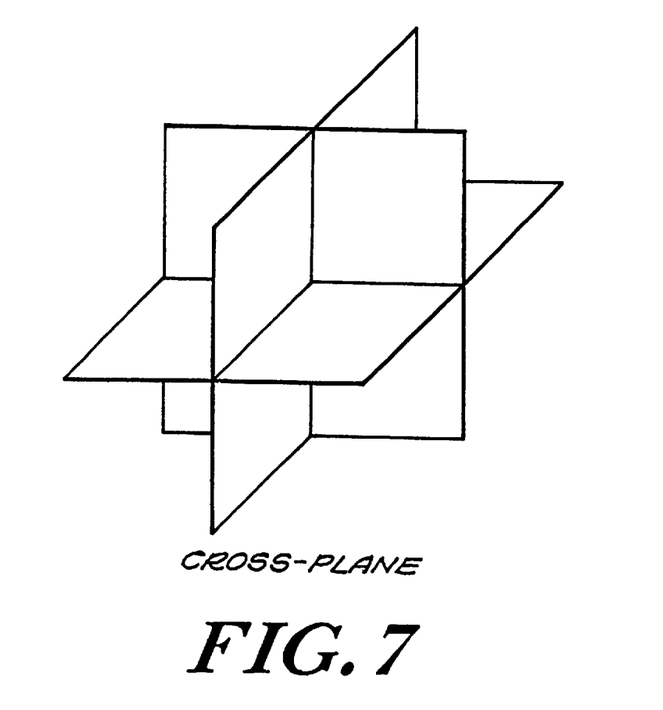
FIG. 7 is a diagrammatic illustration of a cross plane type cursor as enabled by the present invention.

FIG. 6 illustrates a cross hair cursor, and FIG. 7 illustrates a cross plane cursor. The selection of which type of cursor component is to be employed in the first embodiment is realized through a "cursorType" bit in a CURSOR_CONTROL register programmable by software. The use of this bit will be discussed further in the context of an analysis of the logic employed in the 3-D cursor generation unit. As previously indicated, the two types of cursor axis components may be combined in a further embodiment, as desired by the user.

Figure 8:
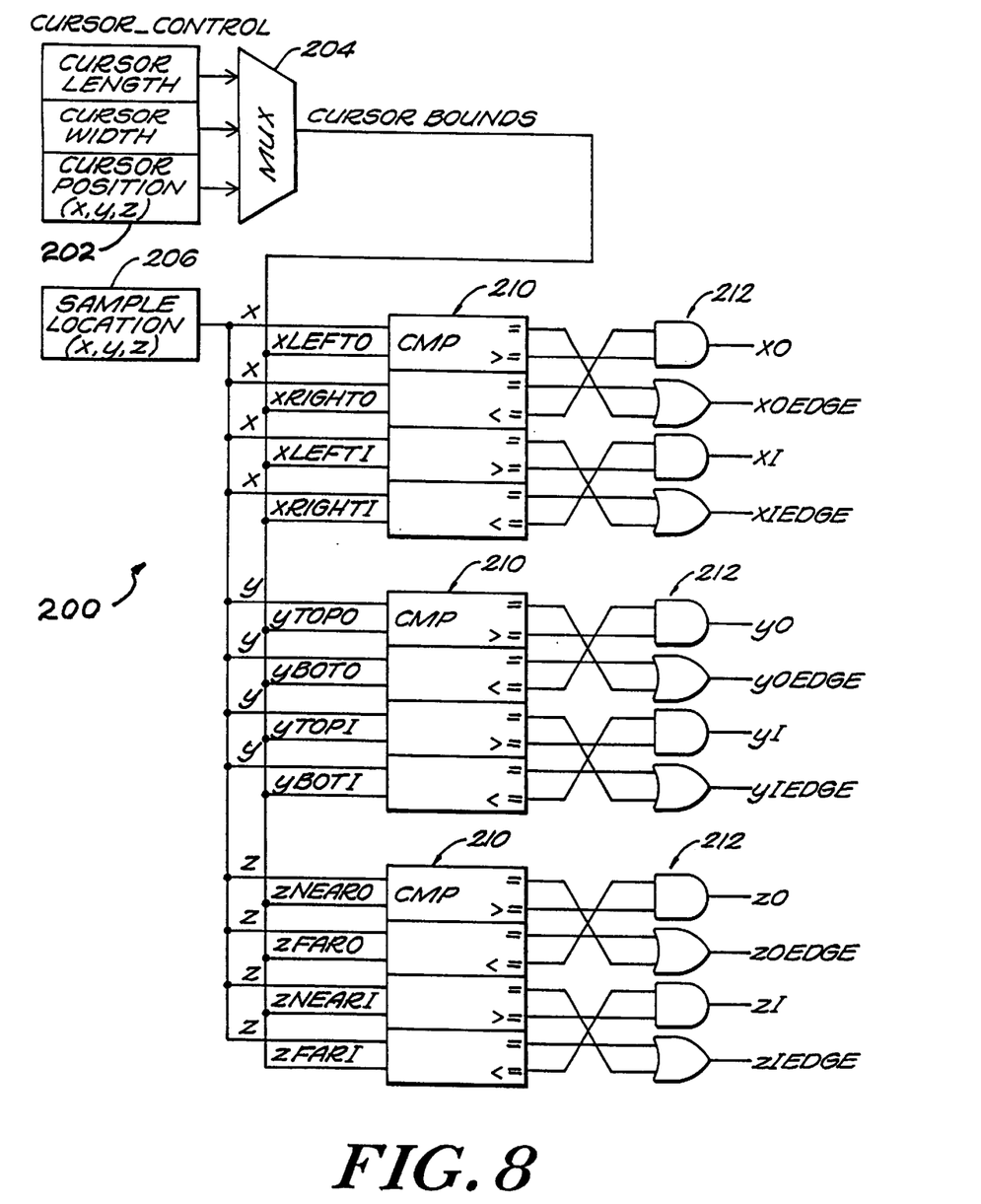
FIG. 8 is a schematic diagram of a circuit utilized in selectively enabling a three-dimensional cursor according to the present invention.
Figure 9:
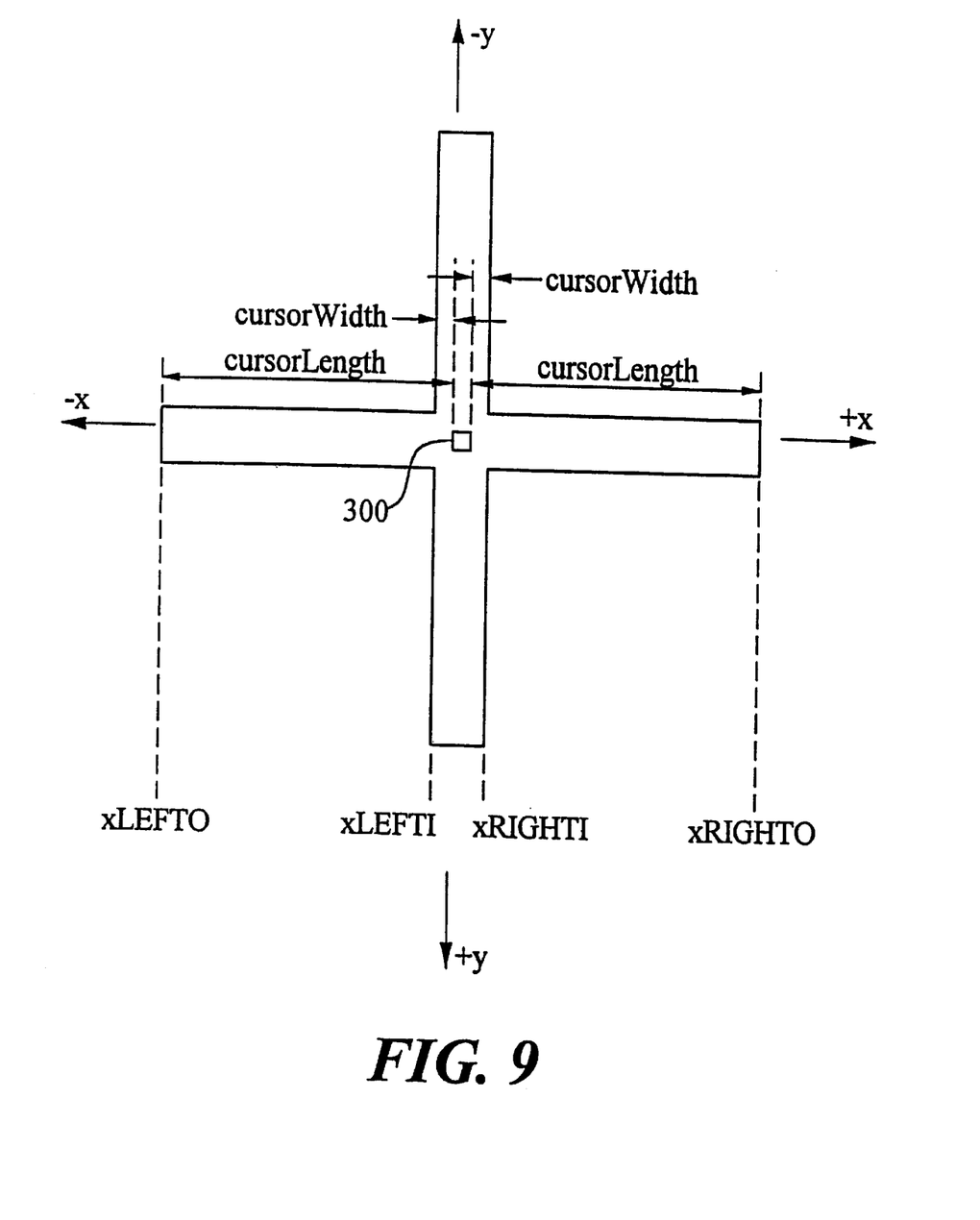
FIG. 9 is a view of a two-dimensional cursor for the purposes of illustrated a number of dimensions useful in defining a cursor according to the present invention.

A schematic representation of an embodiment of the 3-D cursor modulation unit 200 is illustrated in FIG. 8. FIG. 9 illustrates a two dimensions of a three-dimensional cursor which may be realized by the presently disclosed cursor modulation unit, the third dimension being perpendicular to the page. To realize this cursor, two fundamental sets of information must be provided: where the cursor is located; and what area does it occupy. A register 202, referred to as the CURSOR_CONTROL register, acts as storage for this data. This register may be realized as a single software loadable register, or as multiple registers.

One input to the CURSOR_CONTROL register 202 is cursorPosition, a definition of the center point of the cursor, defined in the coordinate system 11 in which the object to be rendered is defined. The center point is defined as a cubic volume 300 of one unit of length per side, and is referred to herein as the center point volume. The unit of length is the distance between adjacent voxels of the object data space along a single axis, in one embodiment. Thus, the center point volume occupies the space starting at the x, y and z components given by cursorPosition and extending one inter-voxel unit in each of the +x, +y and +z directions. CursorPosition allows the positioning of the center point of the cursor anywhere within the permuted space, which in a first embodiment is 256×256×256. Software ensures that the cursor center point does not exceed the maximum or minimum dimensions of the voxel data set being rendered, which would otherwise cause the cursor to become invisible.

Two other entries in the CURSOR_CONTROL register 202 provide the basic information relating to definition of cursor geometry. These are cursorLength and cursorWidth. One way to describe a cursor is to define how far each component of the cross hair or cross plane extends with reference to the origin volume 300. For instance, in FIG. 9, each component of the two-dimensional cursor extends the same length on each side of the origin volume. This length is given by the cursorLength value. Thus, the overall length of the x-axis component (reading left to right) is given by the expression "cursorLength plus one plus cursorLength", or "1+(cursorLength*2)". Likewise, the width of the y-component is given by "cursorWidth plus one plus cursorwidth", or "1+(cursorWidth*2)". By simple extension, a three-dimensional cross hair cursor would provide a z-component of the same dimensions. Note that if both cursorLength and cursorWidth were set to zero, the cursor would still be non-zero, occupying the cursor origin volume. Therefore, by defining the cursor center point location and common length and width dimensions, a three-dimensional cursor can be described.

In one embodiment, cursorLength and cursorwidth are applicable to all of the cursor axis components in the same way. In another embodiment, these entries are defined for each respective cursor component or groups of components.

To carry the explanation forward, if cursorwidth is set equal to one, the total width of the y-axis component in FIG. 9 (according to the formula given above) is three inter-voxel units, or the distance between the cursor origin volume 300 to the nearest voxels in the +x and −x directions. If cursorLength is set to one, the total length of the x-axis component is three inter-voxel units, or the distance between the voxels nearest to the cursor origin volume 300 in the +x and −x directions.

Though enough information is now provided to know the cursor location and extent, the goal is to enable the comparison of sample location with cursor definition to determine if the cursor may affect the sample. Rather than recompute the extent of each cursor component each time it is desired in order to perform this comparison, certain spatial locations which collectively define the cursor are identified prior to the comparison, based upon the fundamental values of cursor origin, length and width. Each of these spatial locations is defined with respect to one of the three coordinate system axes.

With reference again to FIG. 9, it can be seen that the two-dimensional cursor has four significant points along the x axis. A first point is the outer extent of the x component to the left of the origin (xLEFTO), which is given by "x−cursorLength", where x is the origin of the cursor along the x axis. A second significant point is the inner point along the x axis, to the left of the origin, which defines the width of the other axial components (xLEFTI), and which is given by "x−cursorwidth". A third significant point is the inner point along the x axis, to the right of the origin, which defines the width of the other axial components (xRIGHTI), and which is given by "x+width+1" to account for the width of the origin volume 300. Lastly, the fourth significant point is the outer extent of the x component to the right of the origin (xRIGHTO), which is given by "x+cursorLength+1". These points are also illustrated in FIG. 10.

In sum, it can be seen that the outer or "O" points (e.g. xLEFTO) relate to the length of the cursor component, while the inner or "I" points (e.g. XLEFTI) relate to the width of the other cursor components.

Likewise, four corresponding significant points are definable along the y axis from bottom (+y) to top (−y): yBOTO, relating to the extent of the y axis component ("y+cursorLength+1"); yBOTI, relating to the width of the other axial components ("y+cursorwidth+1"); yTOPI, also relating to the width of the other axial components ("y−cursorWidth"); and yTOPO, also relating to the extent of the y axis component ("y−cursorLength").

Figure 10:
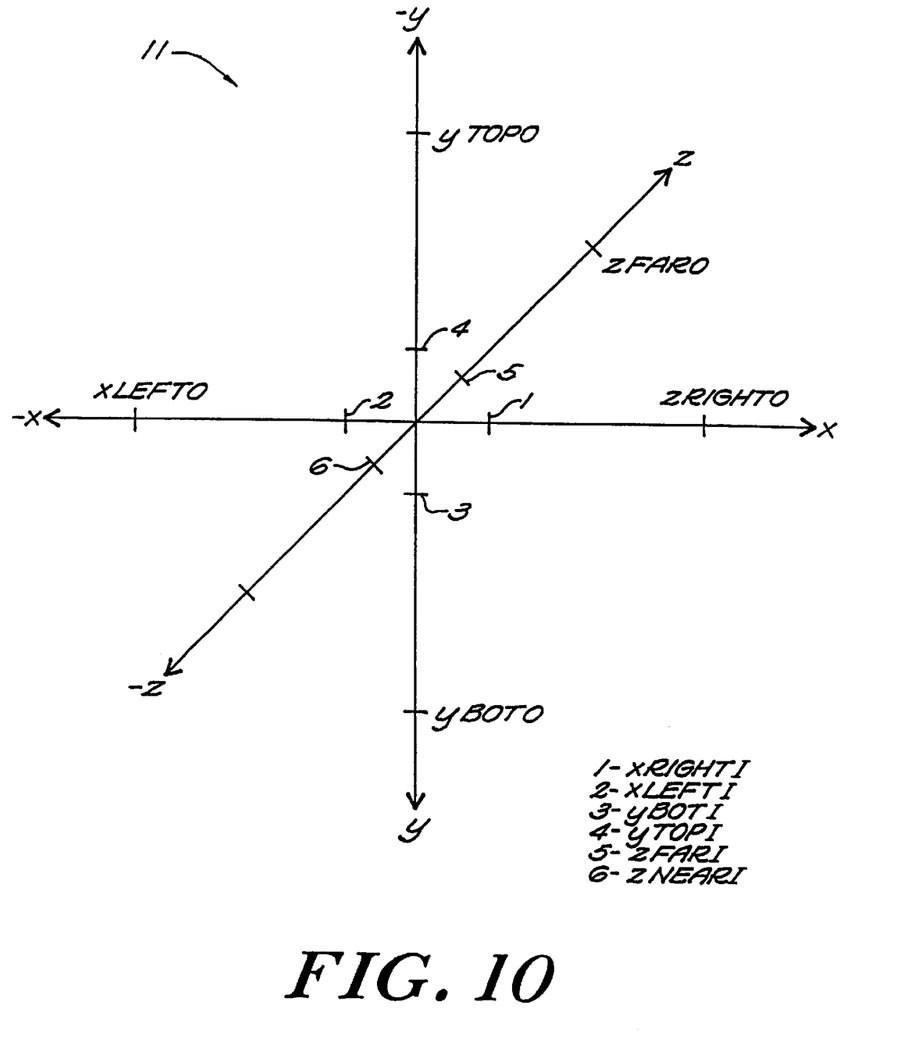
FIG. 10 is a view of a three-dimensional coordinate system illustrating data points used to define a three-dimensional cursor according to the present invention.

In addition, with a three-dimensional cursor as shown in FIG. 10, there are four corresponding significant points along the z axis, from near (−z) to far (+z): ZNEARO, relating to the extent of the z axis component ("z−cursorLength"); zNEARI, relating to the width of the x and y axis components ("z−cursorWidth"); zFARI, also relating to the width of the x and y axis components ("z+cursorwidth+1"); and ZFARO, also relating to the extent of the z axis component ("z+cursorLength+1").

With reference again to FIG. 8, the length, width and center point data are combined by addition and subtraction in combinatorial logic of a multiplexing circuit 204 (labelled "mux" in FIG. 8) to arrive at these twelve significant points which define where, in the object coordinate system, the cursor exists. The output of the circuit 204 labelled "CURSOR BOUNDS" therefore is a simplification; each of the twelve outputs described above is provided from the circuit 204 to a respective comparator 210.

Other inputs to these comparators are the x, y and z coordinates of the current sample point under test. Thus, as the pipelined processing of FIG. 5 progresses to the modulation units, the location of each sample point is compared to the definition of the cursor from the circuit 204. If the current sample is within the cursor space, the cursor definition is further analyzed for the purpose of identifying what impact the cursor will have on the sample characteristics, as discussed below.

The bank of comparators 210 and associated AND and OR gates provide the results of a comparison of between the x, y, z position of the current sample point and the cursor extent definitions from the circuit 204. Thus, the outputs from the comparators 210 and logic gates 212 indicate, for instance, whether the current sample point location in the x dimension is between the locations defined by "xLEFTO" and "xRIGHTO," or between the locations defined by "XLEFTI" and "xRIGHTI." If the current sample is located along the x axis between "xLEFTO" and "xRIGHTO," then "xO" will be set. If the current sample is also located along the x axis between "xLEFTI" and "xRIGHTI," then "xI" will also be set. Additionally, this circuitry provides an indication of whether the current sample point, along any of the coordinate axes, is at an edge of the cursor in that dimension (e.g. "xOEDGE" or "xIEDGE" along the x axis). The latter determination is utilized in an edge rounding function, described subsequently.

The outputs of the comparators 210 and logic gates 212 are further processed by combinatorial logic gates that implement the following pseudocode according to the definition of the cursor desired by the user. The following operators, borrowed from the C programming language, are used in logical expressions defining the various states of this combinatorial logic:

=store the value of the second operand in the object specified by the first operand;

& bitwise AND operator

&& logical AND operator

|bitwise inclusive OR operator

|| logical OR operator

&=assignment operator for obtaining the bitwise AND of the first and second operands and for storing the result in the object specified by the first operand ; end of expression Since the outer or "O" dimensions along an axis define the length of a cross hair component along that axis and the inner or "I" dimensions along the orthogonal axes define the width of the same cross hair component, logical expressions for cross hair cursor axis components are as follows:

crossHairX=xO && yI && zI & enableCursorX;

crossHairY=xI && yO && zI & enableCursorY;

crossHairZ=xI && yI && zO & enableCursorZ;

where enableCursorX, enableCursorY and enableCursorZ are independent enable signals for the respective cursor axis component. Thus, the current sample point is within an x axis cross hair cursor component if it is between XLEFTO and xRIGHTO (i.e. xO is set), yTOPI and yBOTI (i.e. yI is set), and zNEARI and zFARI (i.e. zI is set). "Between" in this context means "xLEFTO<=x<=xRIGHTO".

A sample point is located within a cross hair cursor if it is within one or more of the cursor components, according to:

crossHair=crossHairX|crossHairY|crossHairZ;

With regard to cross plane cursors, the inner or "I" dimensions along an axis define the width of the cross plane cursor component along that axis, and the outer or "O" dimensions along the other two axes define the length of that cross plane component. Thus, logical expressions for cross plane cursor axis components are as follows:

planarx=xI && yO && zO & enableCursorX;

planary=xO && yI && zO & enableCursorY;

planarz=xO && yO && zI & enableCursorZ;

Therefore, a sample point is within the x axis cross plane cursor component if it is between xLEFTI and xRIGHTI (i.e. xI is set), yTOPO and YBOTO (i.e. yO is set), and zNEARO and ZFARO (i.e. zO is set).

A sample point is located within a cross plane 3-D cursor if it is within one or more of the cursor components, according to:

planar=planarx|planarY|planarZ;

Each of the cursor components are individually enabled through the use of the enablecursor{x,y,z} bits in the CURSOR_CONTROL register. Likewise, the cursor as a whole is enabled through the use of a cursorEnable bit in the CURSOR_CONTROL register. If not enabled, the cursor component or cursor as a whole has no effect on the sample.

The type of cursor to be displayed is determined according to a cursorType bit in the CURSOR_CONTROL register.

Therefore, if the cursor as a whole is enabled, and if the cursor type is cross hair and the sample is with the definition of the cross hair cursor, or if the cursor type is cross plane and the sample is within the definition of the cross plane cursor, the sample falls within the cursor. The following expression embodied in the combinatorial logic provides this indication by resolving the following pseudocode:

```
cursor = cursorEnable && (
    ((cursorType == crossHair) && crossHair) ||
    ((cursorType == planar) && planar)
);
```

As previously suggested, a further embodiment of the present invention provides the ability to combine different component types in one cursor. For instance, a compound cursor may comprise x and y cross hairs and a z cross plane. This alternative embodiment is also be realized through a combinatorial logic circuits as described hereabove.

A cursor intersection is the spatial region where plural cursor components overlap. A determination of whether a sample point is within a cursor intersection is achieved by determining whether the sample is simultaneously located within plural cursor components for that cursor type. Combinatorial logic which resolves the following pseudocode is provided to determine whether a sample is within a cursor intersection:

```
intersect =
    ((cursorType == crossHair) &
    (crossHairX & crossHairY & crossHairZ)) ||
    ((cursorType == planar) &
    (planarX & planarY & planarZ));
```

The cursor intersection may be made transparent to samples falling within this region, at the option of the user. This is realized through the use of an "excludeintersections" bit in the CURSOR_CONTROL register. When set (excludeintersections==1), samples falling within the intersection ("intersect=1") are not effected by the cursor component definitions. When not set (excludeintersections==0), samples falling within the intersection are affected by one of the overlapping cursor components. This feature is realized by combinatorial logic implementing the following pseudocode:

cursor &=!(excludeIntersections & intersect);

If the x, y and z cursor components are enabled and the sample point lies within the intersection of these three components, the sample point is affected by the characteristics of the z axis component only, in one embodiment. If the z axis component were disabled, the sample point is only affected by the characteristics of the y axis component. Which cursor component affects the sample point within an intersection is a question of priority which may be predefined or definable at the option of the user.

An additional feature provided in rendering a 3-D cursor according to the presently disclosed invention involves the ability to define whether certain sample points, on the extreme edges of the cursor, are affected by the cursor definition or not. The purpose of this feature is to realize a smoothing or anti-aliasing effect. It can be simply implemented through the use of the comparators 212. A positive value for a "roundEdges" bit in the CURSOR_CONTROL register enables this feature.

Determining whether a sample point lies on an edge of a cursor component depends in part on the type of cursor component. For an x axis cross hair component, the sample point lies on an edge if it is in either of two sets of locations. First, the sample point is on an edge of the x axis cross hair cursor component if it is between the ends of the cursor component (i.e. xO is set) and yIEDGE and zIEDGE are set. Second, the sample point is on an edge of the x axis cross hair cursor component if xOEDGE and either of yIEDGE and zIEDGE are set.

For an x axis cross plane component, the sample point lies on an edge if it is in either of three sets of locations. First, the sample point is on an edge of the x axis cross plane cursor component if it is within the cursor component width (i.e. xI is set) and at the outer limits in both the y and z directions (i.e. yOEDGE and zOEDGE are set). Second, the sample point is on an edge of the x axis cross plane component if it is between the ends of the cursor component in the y direction (i.e. yO is set) and both xIEDGE and zOEDGE are set. Third, the sample point is on an edge of the x axis cross plane component if it is between the ends of the cursor component in the z direction (i.e. zO is set) and both xIEDGE and yOEDGE are set.

Accordingly, the logic which implements this feature realizes the following expressions:

```
roundCrossHairX =
    (xO && (yIEDGE && zIEDGE)) ||
    (xOEDGE && (yIEDGE || zIEDGE));
roundCrossHairY =
    (yO && (xIEDGE && zIEDGE)) ||
    (yOEDGE && (xIEDGE || zIEDGE));
roundCrossHairZ =
    (zO && (xIEDGE && yIEDGE)) ||
    (zOEDGE && (xIEDGE || yIEDGE));
roundCrossHair = (roundCrossHairX ||
    roundCrossHairY ||
    roundCrossHairZ);
roundCrossPlaneX =
    (xI && (yOEDGE && zOEDGE)) ||
    (yO && (xIEDGE && zOEDGE)) ||
    (zO && (xIEDGE && yOEDGE));
roundCrossPlaneY =
    (yI && (xOEDGE && zOEDGE)) ||
    (xO && (yIEDGE && zOEDGE)) ||
    (zO && (yIEDGE && xOEDGE));
roundCrossPlaneZ=
    (zI && (xOEDGE && yOEDGE)) ||
    (xO && (zIEDGE && yOEDGE)) ||
    (yO && (zIEDGE && xOEDGE));
roundPlanar = (roundPlanarX || roundPlanarY || roundPlanarZ);
round = ((cursorType == crossHair) && roundCrossHair) ||
    ((cursorType == planar) && roundPlanar);
cursor &= !(roundEdges & round);
```

Rounding of the cursor edges is therefore enabled through the use of the roundEdges bit in the CURSOR_CONTROL register.

Figure 11:
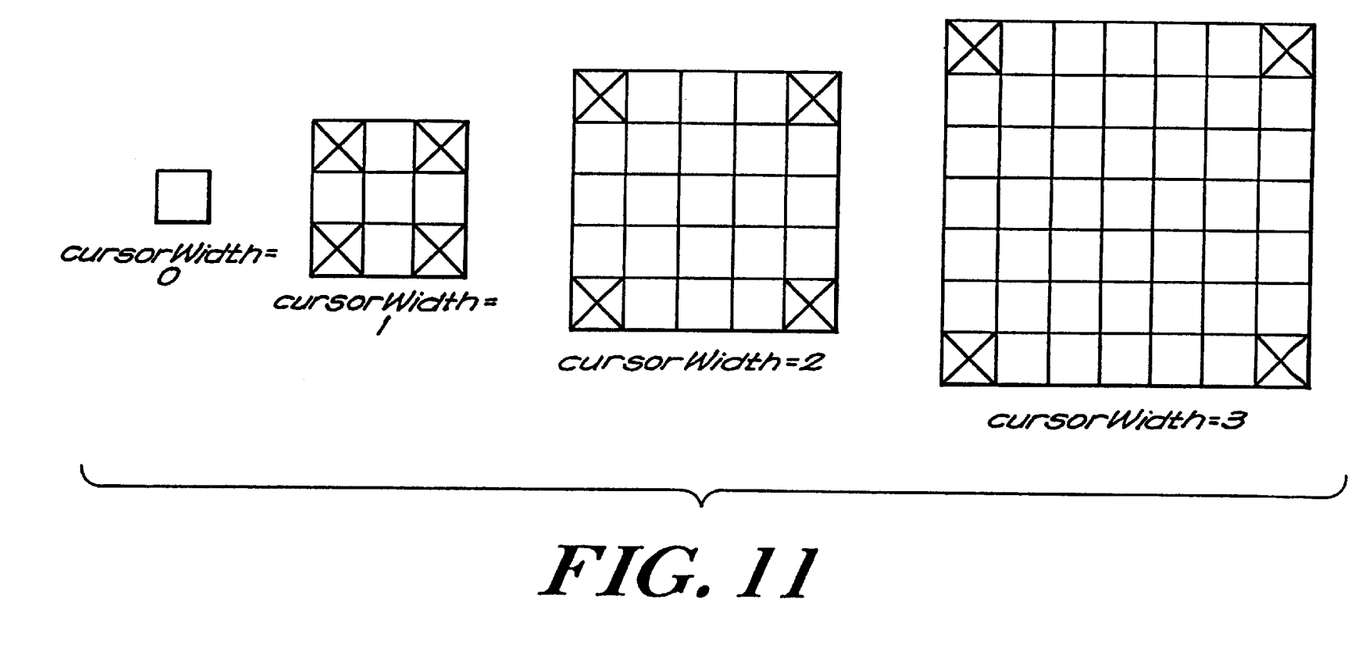
FIG. 11 are diagrammatic illustrations of two-dimensional projections of three-dimensional cursors according to the present invention in which edge rounding is enabled.

The effect of the cursor rounding function is evident in the illustrations of FIG. 11. Here, in two-dimensions, samples within the extreme reaches of the cursor bounds (marked with an "X" in FIG. 11) are not affected by the characteristics of the cursor. However, samples within the remainder of the defined cursor are adjusted as before.

The cursor may be specified with independent colors for each axis component of the cursor through three x, y and z color registers. These are 32-bit color registers, 8 bits each of red, green, blue and alpha (i.e. opacity). The three different axis colors of the cursor are not blended together at axis intersections. As noted above, if the excludeintersections bit is not set, the z-axis color is dominant, followed by the y-axis color, then the x-axis color.

Having determined that a sample point is within the bounds of a cursor, it must now be established how the cursor definition will affect the sample definition. Two modes of altering sample characteristics based upon cursor characteristics are provided in the presently disclosed manipulation unit. In an alpha combine mode, normal alpha blending is performed between the existing ray color value to that sample point and the cursor color value. Compositing continues beyond the cursor pixels. In replacement mode, the existing ray color value to that sample point is replaced by the cursor color value. In the latter case, if the cursor color value is set to full opacity, then the final ray value is the cursor color and no further compositing occurs for that ray. Other combinatorial modes are enabled, including the ANDing, ORing or multiplication of sample and cursor characteristics. Thus, these modes affect the ray definition as composited to the present sample location. The characteristics of the present sample may therefore be interpreted to include the characteristics of the ray composited up to the present sample location.

Further, an alternative embodiment affects the characteristics of the present sample only prior to the sample being composited with the remainder of the previously composited ray.

In either case, a combine/replace engine receives the characteristics of the previously composited ray or of the current sample, depending upon the embodiment, along with the characteristics of the cursor at the sample location, as defined above, and affects the logical operations required to result in either a combination of the sample and cursor values, or the cursor characteristics only.

The output from this modulation unit flows to other modulation units 126 or directly to the compositing unit 124 itself for continued processing.

Other modulation units may affect the rendering of the 3-D cursor at the option of the user. For instance, if only a portion of a volume is rendered, the user may desire for the cursor to not be visible in the non-illuminated portion. Software must thus prevent cursorPosition definition within eliminated portions of the object through a comparison of the cursorPosition value with a definition of the portion of the volume to be rendered. In one embodiment, the option is provided to the user through the use of a disableCursorCrop bit in the CURSOR_CONTROL register 202. If set, the cursor is disabled if cursorPosition is outside the portion of the volume to be rendered. If not set, the cursor is enabled even if cursorPosition is in a region of the object volume which is not to be rendered.

Variations on the foregoing embodiments of the 3-D cursor modulation unit are also considered to be part of the present invention. For instance, certain cursor-defining points in the object coordinate system are defined in integer voxel coordinates, though this is not a requirement.

Further, the sample manipulation associated with the generation of the 3-D cursor accommodates variations in the processing pipeline illustrated in schematic form in FIG. 5. For instance, 3-D cursor generation as discussed is possible whether the pipeline operates in image order or in object order. Likewise, if the processing pipeline were re-ordered such that classification preceded interpolation, the present 3-D cursor modulation unit can be implemented in conjunction with the classification stage, resulting in the positive effect of anti-aliasing. In fact, the 3-D cursor manipulation unit can be implemented at any point in the pipeline during or after the assignment of colors.

These and other examples of the invention illustrated above are intended by way of example and the actual scope of the invention is to be limited solely by the scope and spirit of the following claims.

What is claimed is:

1. Apparatus for generating a cursor within a rendering of a three-dimensional volume, comprising:

multiple pipelined stages for enabling real-time generation of said rendering, said multiple pipelined stages comprising a modulation unit for defining the extent of said cursor within said volume and for determining whether a sample point within said volume is within said cursor extent, wherein said modulation unit does not introduce a throughput reduction to said pipelined stages.

2. The apparatus of claim 1, wherein said multiple pipelined stages comprise:

a volume memory for storing a multi-dimensional representation of said volume;

a sample point definition element in communication with said memory for defining characteristics of said sample point within said volume based upon said multi-dimensional representation; and a compositing element for compositing the characteristics associated with each of plural sample points to generate said rendering.

3. The apparatus of claim 1, wherein said cursor comprises at least one cursor component, and said modulation unit comprises register portions for storing the location of the center point of said cursor, a definition of the physical dimensions of said at least one cursor component about said center point, and a location of said sample point.

4. The apparatus of claim 3, wherein said modulation unit further comprises combinatorial logic for defining, based upon the contents of said register portions, the space occupied by said cursor.

5. The apparatus of claim 4, wherein said modulation unit further comprises comparators for comparing said sample point location with said definition of said space occupied by said cursor to determine if said sample point is within said space occupied by said cursor.

6. The apparatus of claim 5, wherein said cursor register portions further comprise storage for characteristics of each of said cursor components.

7. The apparatus of claim 6, wherein said modulation unit further comprises a sub-unit for determining how values associated with said sample point are to be modified, if at all, by said characteristics of said cursor component or components at said sample point location.

8. The apparatus of claim 7, wherein said sub-unit replaces said sample point values with said characteristics of said cursor component or components at said sample location in a first mode, and combines said values and characteristics in a second mode.

9. The apparatus of claim 7, wherein said sub-unit is programmable by a user to define which of said cursor components are enabled.

10. The apparatus of claim 7, wherein said sub-unit is for identifying a volume at an intersection of said cursor components and is further programmable by a user to define whether a sample point within said intersection volume is to be effected by any of said cursor component characteristics.

11. The apparatus of claim 7, wherein said sub-unit is programmable such that if a sample point is determined to be within multiple cursor components, said sample point is effected only by characteristics of a first of said multiple cursor components.

12. The apparatus of claim 6, wherein the characteristics for each of said cursor components are independently definable.

13. The apparatus of claim 6, wherein said cursor component characteristics include color and degree of opacity.

14. The apparatus of claim 3, wherein said at least one cursor component is selected from the group consisting of a cross hair component and a cross plane component.

15. A method of rendering, in real-time, a cursor in a multi-dimensional volume, comprising:

providing a representation of said multi-dimensional volume;

defining characteristics of a sample point within said volume from said representation via pipelined processing elements operating on said representation;

providing a definition of a cursor center point, extent and characteristics to a modulation unit operating in series with said pipelined processing elements;

determining, by said modulation unit, whether said sample point is within said cursor extent;

modifying, by said modulation unit, characteristics associated with said sample point according to said cursor characteristics at said sample point; and compositing, in a further pipelined processing element, said sample point with other sample points.

16. The method of claim 15, wherein said step of providing further includes providing said representation as a three-dimensional array of voxels collectively defining said volume.

17. The method of claim 15, wherein said step of defining further includes locating said sample point within said representation and interpolating data points within said representation in order to define said sample point characteristics.

18. The method of claim 17, wherein said step of defining further comprises estimating the gradient of said sample point and classifying said sample point in order to apply an illumination algorithm in defining said sample point characteristics.

19. The method of claim 15, wherein said step of providing further comprises defining, based upon user input, whether said cursor in enabled and whether individual components of said cursor are enabled.

20. The method of claim 15, wherein said step of providing comprises defining a width metric and a length metric common to all components of said cursor.

21. The method of claim 15, wherein said step of providing further comprises defining, based upon user input, whether each component of said cursor is a cross hair component or a cross plane component.

22. The method of claim 15, wherein said step of providing further comprises defining an RGB color value and degree of opacity for each of said cursor components.

23. The method of claim 15, wherein said step of providing further comprises rounding said cursor by removing portions of the edges of said cursor components in the definition of the extent of said cursor.

24. The method of claim 15, wherein said step of modifying further comprises replacing said sample point characteristics with said cursor characteristics at said sample point.

25. The method of claim 15, wherein said step of modifying further comprises combining said sample point characteristics with said cursor characteristics at said sample point.

* * * * *